United States Patent [19]

Skelly

[11] 4,219,049
[45] Aug. 26, 1980

[54] MULTIPLE FLOW SELECTION VALVE

[76] Inventor: Michael Skelly, Rte. 5-Canyon Oaks-Bx 2-4, Claremore, Okla. 74017

[21] Appl. No.: 929,312

[22] Filed: Jul. 31, 1978

[51] Int. Cl.[2] .............................................. F16K 11/06
[52] U.S. Cl. .............................. 137/625.3; 137/625.46
[58] Field of Search .......... 137/625.3, 625.46, 625.47, 137/876; 251/206, 207, 208, 209

[56] References Cited

U.S. PATENT DOCUMENTS

| | | | |
|---|---|---|---|
| 913,632 | 2/1909 | Foster | 137/625.46 X |
| 3,589,399 | 6/1971 | Vignes | 137/625.3 |
| 3,837,360 | 9/1974 | Bubula | 137/625.46 |

*Primary Examiner*—Alan Cohan
*Attorney, Agent, or Firm*—James H. Chafin

[57] ABSTRACT

A multiple flow selection valve connectable to a plurality of fluid sources, the valve having a fluid return port and a fluid working port and being operable to add or subtract the flow rates of the plurality of fluid sources to either the working port or the return port for the primary purpose of driving a constant volume motor connected to the working port and such that the total fluid flow rate through the valve is substantially constant. The device may be used to mix various fluids from different sources.

6 Claims, 4 Drawing Figures

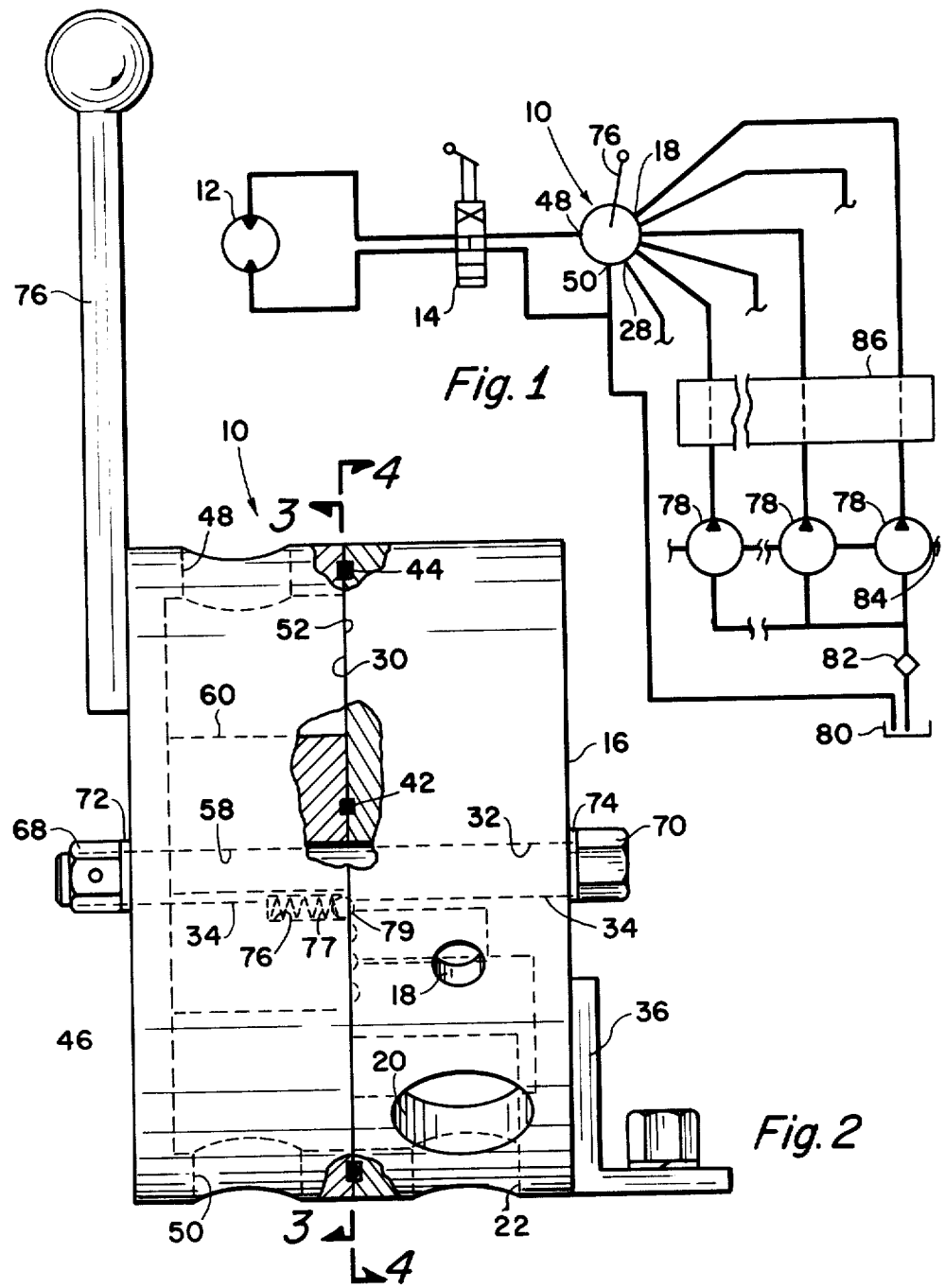

MULTIPLE FLOW SELECTION VALVE

BACKGROUND OF THE INVENTION

1. Field of the Invention

The present invention relates to fluid power control valves and more particularly, but not by way of limitation, to a hydraulic multiple flow selection valve.

2. History of the Prior Art

Fluid power engineers are constantly confronted with the need for being able to drive fluid motors, and particularly hydraulic motors at different speeds.

The typical motor is a positive displacement motor or also known as a constant displacement motor that can be varied only by increasing the fluid flow rate through the motor. This can be accomplished by either increasing the fluid pressure causing the higher flow rate and in turn requiring larger volume present at the motor or by being able to connect several pumps in parallel to increase the flow rate through the motor.

The first solution, that of varying the pressure is often impractical since the fluid sources available are also used to operate ancillary equipment such as hydraulic jacks, rams or the like which must operate on a lower or at least substantially constant pressure.

The second solution of varying the volume flow rate is usually accomplished through a plurality of parallel and series connected valves putting one or more hydraulic pumps on the line in connection with the motor. This solution is costly and increases and likelihood of system failure due to the introduction of many separate components.

Another problem associated with the use of several valves is that of hydraulic shock encountered by not being able to "feather" or gradually bring in a new volume rate by simultaneously opening and closing several valves.

There are infinitely variable speed control systems commercially available but again are often impractical due to their being expensive and difficult to maintain.

SUMMARY OF THE INVENTION

The present invention provides a single valve apparatus which comprises two separate valve body elements one or both being rotatable on a common shaft. One of the valve body members is provided with a pair of separated cavities one of which is connected to a working outlet port and the other being connected to a return outlet port.

The other valve body member is connectable to a plurality of ports, each connectable to a separate hydraulic pump outlet for bringing fluid from several sources into the valve. The inlet ports of the second valve body may selectively be placed into communication with each of the two cavities of the first mentioned valve body and which is accomplished by rotating one of the valve body members with respect to the other valve body member.

Thus when it is desired to change the flow rate through the working outlet port for varying the speed of the hydraulic motor connected thereto, one part of the valve body is simply rotated with respect to the other part of the valve body thereby bringing a different number of hydraulic inlet ports into communication with the cavity which is connected to the working outlet port. The remaining inlet sources of the hydraulic fluid are routed into the second cavity which is connected to the return port and thereby allows the fluid to return to the reservoir.

When a rate of change of fluid flow is desired, one valve body is slowly rotated with respect to the other valve body which produces a feathering action occurring when an individual port straddles the separation between the two cavities thereby allowing part of the fluid to go toward the working outlet port and part to go to the return outlet port. This operation will greatly reduce hydraulic shock which occurs in some operations wherein multiple valves are used.

It will become evident upon a detailed description of the invention, that the valve can be used to very efficiently and effectively provide multiple speeds to a hydraulic drive motor by the operation of a single valve operator.

It will become apparent that the device can be used for mixing or combining fluids from different sources.

DESCRIPTION OF THE DRAWINGS

Other and further advantageous features of the present invention will hereinafter more fully appear in connection with a detailed description of the drawings in which:

FIG. 1 is a schematic of a hydraulic system employing a valve which embodies the present invention.

FIG. 2 is a side elevational view, partially in section, depicting a valve embodying the present invention.

DESCRIPTION OF THE PREFERRED EMBODIMENT

Figure 3:
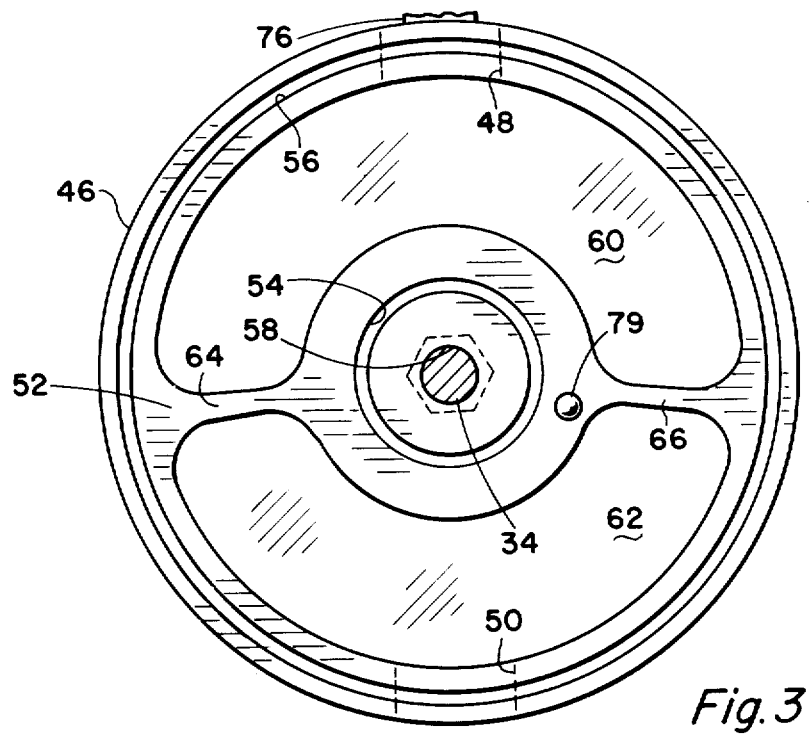
FIG. 3 is a sectional end elevational view of the opposite valve body member of FIG. 2 taken along the broken line 3—3 of FIG. 2.

Referring to the drawings in detail, reference character 10 generally represents a multiple flow selection valve for use in a hydraulic system such as the system schematically described and shown in FIG. 1 of the drawings. The valve is primarily used to control the volume flow rate of fluid through a fluid motor 12 by way of a directional flow valve 14.

The valve 10 primarily consists of a first valve body member 16 which is cylindrical in shape and is provided with a plurality of hydraulic inlet ports 18 through 28. One end of the cylindrical valve body 16 comprises a flat plate portion 30 having a plurality of ports 18a through 28a corresponding with and in communication with each of the ports 18 through 28, respectively. The body member 16 is also provided with a central bore 32 completely therethrough and perpendicular to the plane of the face portion 30 for receiving one end of a shaft 34 therethrough.

The side of the body member 16 opposite the flat face 30 is provided with a suitable mounting bracket 36 for solidly mounting said body member.

The flat face portion 30 of the body member 16 is provided with inner and outer O-ring grooves 38 and 40, such that the groove 38 surrounds the shaft 34 but lies inside the plurality of longitudinal ports 18a through 28a and the O-ring groove 40 is provided around the outer portion of the flat face 30 and lies between the outer edge of the body and said longitudinal ports 18a through 28a. The O-ring grooves 38 and 40 are for the purpose of receiving suitable O-ring sealing members 42 and 44 respectively for a purpose that will be hereinafter set forth.

Also provided in the flat face 30 of the valve body member 16 are a plurality of hemispherical indents identified by the alphabetical characters a through l for a purpose that will be hereinafter set forth.

The valve 10 further comprises a second valve body member 46 which is of a similar cylindrical configuration and is provided with two substantially oppositely disposed ports, a work outlet port 48 and a return outlet port 50.

The valve body member 46 also is provided with a flat face portion 52 which is matable with the face portion 30 of the body member 16. The face portion 52 of the body member 46 is provided with concentric O-ring grooves 54 and 56 which may be aligned with the grooves 38 and 40 of the body member 16 to retain the O-ring members 42 and 44 respectively.

The body member 46 is also provided with a longitudinal centrally disposed bore 58 which when positioned against the valve body member 16 is in alignment with the bore 32 therethrough for receiving the shaft 34. Further, the body member 46 is journalled on the shaft 34 for rotation thereabout with the faces 52 and 30 being in sliding contact as shown in FIG. 2.

The flat face 52 of the body member 46 is provided with a first cavity 60 which is in open communication with the work outlet port 48. The cavity 60 is arcuate in shape and generally lies between the O-ring grooves 54 and 56.

The flat face 52 of the body member 46 is also provided with a second arcuate shaped cavity 62 in which is in open communication with the return outlet port 50. The cavity 62 is separated from the cavity 60 by separation walls 64 and 66 and likewise it lies between the O-ring grooves 54 and 56. When the valve body members 16 and 46 are both journalled on the shaft 34, they may be held in place by oppositely disposed nut members 68 and 70 and washer members 72 and 74, respectively. One or both of the washer members 72 and 74 may be split-type spring washers for urging the body members together.

Figure 4:
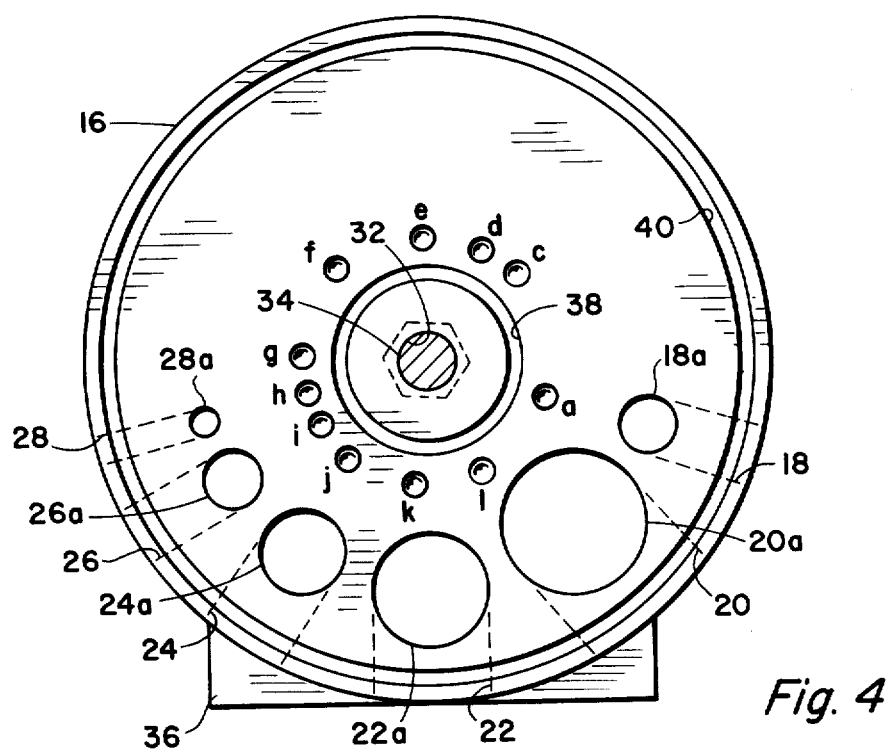
FIG. 4 is a view of the valve member then along line 4—4 of FIG. 2.

The valve body member 46 is provided with a radially extending handle member 76 which may be rigidly attached to the face opposite the flat face 52 for the purpose of rotating the body member 46 with respect to the body member 16 about the shaft 34. It can be seen in FIG. 4 that the plurality of ports 18a through 28a are radially spaced on one side of the flat face 30 within a subtended angle of less than 180°. It can also be seen in FIG. 3 that the separation wall 64 and 66 separating the cavities 60 and 62 are also radially extending in substantially opposite directions on either side of the shaft 34.

Also provided on the flat face 52 of the valve body member 46 is a longitudinal bore 76 for receiving a spring member 77 and detent ball 79 therein. The detent ball 79 is radially spaced from the center of the rotational shaft 34 by an amount compatible with the hemispherical recesses a through l of the valve body member 16.

A typical operation of the valve 10 would be used to vary the flow rate of fluid through the motor 12 in the following manner: When the valve body member 46 is positioned so that the ports 18a through 28a are in communication with the cavity 62, fluid flows from the pump 78 through the cavity 62 and then through the return port 50 back through the reservoir 80. The motor 12 may be brought into operation by adjusting the directional flow valve 14 to initiate the drive motor 12 in the desired direction of rotation. Then the valve operator 76 may be rotated to bring one or more of the ports 18a through 28a into contact with the cavity 60 of the valve. For instance the ports 28a and 26a may be brought into communication with the cavity 60 and locked into place by the ball detent member 79 and the appropriate hemispherical recess. The fluid from the pump 78 flows through the inlet ports 28 and 26 then passes into the cavity 60 and through the working outlet port 48 to the motor 12. The hydraulic fluid provided through the inlet ports 18 through 24 is simultaneously passed through the cavity 62, through the return port 50 and back to the hydraulic reservoir 80.

To increase the motor speed, the valve may be slowly operated to bring the port 24a into communication with the cavity 60. It can be seen that while the port 24a straddles the separation wall 66, part of the fluid therefrom flows through the cavity 60 and out the working outlet port while part of the flow is returned through the return port 50. This provides a feathering action which will serve to prevent hydraulic shock by changing the flow rate from one amount to another.

It can be readily seen that the configuration of the valve may be changed by changing the shape and size of the cavities 60 and 62 and by changing the size number, and displacement of the ports 18a through 28a for an operation that will still be within the teachings of this invention.

Whereas, the present invention has been described in particular relation to the drawings attached hereto, other and further modifications apart from those shown or suggested herein may be made within the spirit and scope of the invention.

What is claimed is:

1. A multiple flow selection valve comprising:
   a first valve body member, a plurality of separate fluid inlet ports provided therein;
   a second valve body member, a first cavity provided in said second member, a fluid return port carried by said second member and in communication with the first cavity, a second cavity provided in said second member, a fluid working port carried by said second member and in communication with the second cavity;
   means for connecting said first and second valve body members together such that one said member is moveable with respect to the other, the said inlet ports of the first member being selectively positionable in communication with one or both of said first and second cavities of the second member.

2. A multiple flow selection valve as set forth in claim 1 wherein the means for connecting the first and second valve body members together comprises a common shaft whereby said first valve body member is rotatable with respect to the second valve body member.

3. A multiple flow selection valve as set forth in claim 2 wherein the first valve body member comprises a flat surface, the plurality of fluid inlet ports being radially spaced in communication with that surface and about said common shaft, said second valve body member comprising a flat surface containing said first and second cavities, said cavities being arcuate in shape also about said common shaft, separation walls separating the ends of said cavities.

4. A multiple flow selection valve as set forth in claim 3 and comprising a plurality of ball detent recesses in the flat face of one valve body and a yieldable detent ball in the the flat face of opposite valve body such that said first and second valve body members may be positioned with respect to each other such that the fluid inlet ports will be in communication with either the first cavity or the second cavity and not both.

5. A multiple flow selection valve comprising:
a first valve body member comprising a first flat face portion, a plurality of separate fluid inlet ports provided in said first member, each being connectable to a separate fluid source and each being spaced apart and in communication with the first flat face portion;
a second valve body member movably connected to the first valve body member and having a second flat face portion in movable engagement with the first flat face portion of the first member, a first cavity provided in the second flat face portion for selective communication with said fluid inlet ports, a second cavity provided in the second flat face portion for communication with each of the inlet ports which are not in communication with the first cavity, a fluid return port carried by said second member and in communication with the first cavity thereof and a fluid working port carried by said second member and in communication with said second cavity thereof;
whereby said fluid inlet ports are arranged on said first flat face portion with respect to said cavity member on said second flat face portion such that one body member is movable with respect to the other to selectively add or subtract the number of inlet ports in communication with said first cavity which simultaneously aligns the second cavity with the fluid inlet ports which are not in communication with the first cavity to provide a constant fluid flow from all of the fluid inlet ports to the working port or the return port.

6. A multiple flow selection valve as set forth in claim 5 wherein the fluid inlet ports are radially spaced over no more than 180° on the surface of said first flat face portion wherein the first cavity is arcuate in shape and subtends the same angle as that subtended by the inlet ports and wherein the second cavity is arcuate in shape and subtends an angle of approximately 360° minus the subtended angle of the first cavity and including separation walls separating the ends of said cavities and wherein the second body member is rotatably secured to the first body member for selective alignment of the cavities with the fluid inlet ports.

* * * * *